United States Patent
Alshaalan (10) Patent No.: US 11,383,773 B2
(45) Date of Patent: Jul. 12, 2022

(54) STABILITY CONTROL FOR LOAD TRANSPORT VEHICLES

(71) Applicant: Saudi Arabian Oil Company, Dhahran (SA)

(72) Inventor: Yasser Alshaalan, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 60 days.

(21) Appl. No.: 16/915,269

(22) Filed: Jun. 29, 2020

(65) Prior Publication Data
US 2021/0403103 A1    Dec. 30, 2021

(51) Int. Cl.
*B62D 37/04* (2006.01)
*B66F 9/075* (2006.01)

(52) U.S. Cl.
CPC .......... *B62D 37/04* (2013.01); *B66F 9/07559* (2013.01)

(58) Field of Classification Search
CPC .. B62D 37/04; B62D 49/0628; B66F 9/07559
USPC ................................................. 280/755, 758
See application file for complete search history.

(56) References Cited

U.S. PATENT DOCUMENTS

| | | | | |
|---|---|---|---|---|
| 4,502,709 A * | 3/1985 | Schaeff | ............... | B66F 9/07554 280/758 |
| 8,136,839 B2 * | 3/2012 | Bourn | .................. | B62D 49/085 280/755 |
| 8,602,153 B2 * | 12/2013 | Osswald | ................ | B60K 25/06 180/306 |
| 10,782,202 B2 * | 9/2020 | Bonnet | ................. | E02F 9/2033 |

FOREIGN PATENT DOCUMENTS

| | | |
|---|---|---|
| CN | 102358600 | 2/2012 |
| DE | 1057534 | 5/1959 |
| DE | 102017009094 | 3/2019 |
| EP | 0071796 | 2/1983 |
| EP | 1424306 | 6/2004 |

(Continued)

OTHER PUBLICATIONS na.bhs1.com (online), "Understanding the Forklift Stability Triangle," BHS, retrieved from URL <https://na.bhs1.com/understanding-the-forklift-stability-triangle/>, retrieved on Jun. 15, 2020, published Jun. 13, 2018, 3 pages.

(Continued)

*Primary Examiner* — Paul N Dickson
*Assistant Examiner* — Caitlin Anne Miller
(74) *Attorney, Agent, or Firm* — Fish & Richardson P.C.

(57) ABSTRACT

The vehicle includes a load bearing portion, a counterweight, a stability control system and a controller. The counterweight is mounted on the load transport vehicle along a longitudinal axis of the load transport vehicle. The counterweight is configured to counter a first moment generated by a load carried by the load bearing portion. The first moment causes the load transport vehicle to rotate along a first vertical plane perpendicular to a ground on which the load transport vehicle rests or is driven. The first plane is parallel to the longitudinal axis. The stability control system is mounted on the load transport vehicle. The stability control system is extendable along the longitudinal axis to counter a second moment causing the load transport vehicle to rotate along the first vertical plane.

19 Claims, 4 Drawing Sheets

(56) References Cited

FOREIGN PATENT DOCUMENTS

| FR | 2815319 | 4/2002 |
|----|---------|--------|
| JP | 2005200212 | 7/2005 |
| WO | WO 2007081020 | 6/2009 |

OTHER PUBLICATIONS thebalancesmb.com (online), "Keeping a Forklift's Center of Gravity Within the Stability Triangle," the balance small business, retrieved from URL <https://www.thebalancesmb.com/forklift-stability-triangle-2877832>, retrieved on Jun. 15, 2020, updated Oct. 10, 2019, 3 pages.

PCT International Search Report and Written Opinion in International Appln. No. PCT/US2021/039515, dated Oct. 15, 2021, 15 pages.

\* cited by examiner

STABILITY CONTROL FOR LOAD TRANSPORT VEHICLES

TECHNICAL FIELD

This disclosure relates to load transport vehicles that carry and transport loads, for example, forklifts and similar vehicles.

BACKGROUND

Load transport vehicles such as forklifts are used to carry and transport loads. In such a vehicle, the load is often attached to a front end or a back end. Doing so induces a rotational moment about the vehicle's longitudinal axis which can cause the vehicle to tip forwards or backwards under the weight of the load. Also, when the vehicle is being driven on uneven surfaces while carrying the load or the vehicle changes direction while carrying the load, a rotational moment in a direction transverse to the vehicle's longitudinal axis can cause the vehicle to tip to the side.

SUMMARY

This disclosure describes technologies relating to stability control for load transport vehicles.

Certain aspects of the subject matter described here can be implemented as a load transport vehicle. The vehicle includes a load bearing portion, a counterweight, a stability control system and a controller. The counterweight is mounted on the load transport vehicle along a longitudinal axis of the load transport vehicle. The counterweight is configured to counter a first moment generated by a load carried by the load bearing portion. The first moment causes the load transport vehicle to rotate along a first vertical plane perpendicular to a ground on which the load transport vehicle rests or is driven. The first plane is parallel to the longitudinal axis. The stability control system is mounted on the load transport vehicle. The stability control system is extendable along the longitudinal axis to counter a second moment causing the load transport vehicle to rotate along the first vertical plane. The stability control system is swingable along a horizontal plane parallel to the ground to counter a third moment causing the load transport vehicle to tip along a second vertical plane perpendicular to the first vertical plane. The controller is connected to the stability control system. The controller is configured to control extending and swinging of the stability control system based on the second moment and the third moment, respectively.

An aspect combinable with any other aspect includes the following features. The controller is configured to transmit a first signal to deploy the stability control system to extend along the longitudinal axis responsive to determining the second moment and transmit a second signal to deploy the stability control system to swing about the horizontal plane responsive to determining the third moment.

An aspect combinable with any other aspect includes the following features. The vehicle includes a load sensor attached to and configured to sense the load carried by the load bearing portion. The load sensor is connected to and configured to transmit the sensed load to the controller. The controller is configured to determine the second moment based on the sensed load received from the load sensor.

An aspect combinable with any other aspect includes the following features. The controller is configured to transmit the first signal to deploy the stability control system to extend along the longitudinal axis responsive to determining that the second moment exceeds a second moment threshold.

An aspect combinable with any other aspect includes the following features. A quantity by which the stability control system is extendable is variable between an upper extension limit and a lower extension limit. The controller is configured to determine a first quantity by which the stability control system is to be extended to fully counter the second moment and to prevent the load transport vehicle from rotating along the first vertical plane, and generate the first signal based on the determined first quantity.

An aspect combinable with any other aspect includes the following features. The vehicle includes a tipping sensor attached to and configured to sense a tipping load that causes the load transport vehicle to tip along the second vertical plane. The tipping sensor is connected to and configured to transmit the sensed tipping load to the controller. The controller is configured to determine the third moment based on the sensed tipping load received from the load sensor.

An aspect combinable with any other aspect includes the following features. The controller is configured to transmit the second signal to deploy the stability control system to swing about the horizontal plane responsive to determining that the third moment exceeds a third moment threshold.

An aspect combinable with any other aspect includes the following features. A quantity by which the stability control system is swingable is variable between an upper swing limit and a lower swing limit. The controller is configured to determine a second quantity by which the stability control system is to be swung to fully counter the third moment and to prevent the load transport vehicle from tipping along the second vertical plane, and generate the second signal based on the determined second quantity.

An aspect combinable with any other aspect includes the following features. The controller is configured to determine the first signal or the second signal when the load transport vehicle is stationary or in motion.

An aspect combinable with any other aspect includes the following features. The controller is configured to determine the first signal and the second signal simultaneously causing the stability control system to extend and swing simultaneously.

An aspect combinable with any other aspect includes the following features. The counterweight is above the ground and the stability control system is directly attached to and immediately above the counterweight.

An aspect combinable with any other aspect includes the following features. A center of mass of the load transport vehicle and a center of mass of the stability control system lie on the longitudinal axis.

An aspect combinable with any other aspect includes the following features. The counterweight is a first counterweight. The stability control system includes a second counterweight and an extension mechanism connected to the second counterweight. The extension mechanism is configured to extend or retract the second counterweight. The extension mechanism includes multiple telescoping tubular members and an actuator connected to the controller. An end of one of the multiple telescoping tubular members is attached directly to the second counterweight. The actuator is connected to the multiple telescoping tubular members. The actuator is configured to actuate the multiple telescoping tubular members to extend or retract.

An aspect combinable with any other aspect includes the following features. The stability control system comprises a ball joint. The actuator is configured to swing the second counterweight about the ball joint.

An aspect combinable with any other aspect includes the following features. The vehicle includes an engine mounted to the load transport vehicle to provide motive force to drive the load transport vehicle. The vehicle includes multiple wheels coupled to the engine to transport the load transport vehicle under the motive force provided by the engine. The controller is connected to the engine and the multiple wheels, and is configured to determine the second moment and the third moment based, in part, on a speed of the load transport vehicle.

Certain aspects of the subject matter described here can be implemented as a method. A load sensed by a load sensor attached to a load bearing portion of a load transport vehicle is received. The load is carried by the load bearing portion. The load generates a first moment along a first vertical plane perpendicular to a ground on which the load transport vehicle rests or is driven. The first vertical plane is parallel to a longitudinal axis of the load transport vehicle. A tipping load is received from a tipping sensor attached to the load transport vehicle. The tipping load generates a second moment along a second vertical plane perpendicular to the first vertical plane. Based on the received load the received tipping load, it is determined that the load transport vehicle is likely to tip along the second vertical plane in a direction. Before the vehicle tips along the second vertical plane in the direction, a stability control system mounted on the load transport vehicle is deployed in response to determining that the load transport vehicle is likely to tip. Such deploying includes swinging the stability control system in a direction opposite to the direction in which the load transport vehicle is likely to tip.

An aspect combinable with any other aspect includes the following features. Such deploying also includes extending the stability control system along the longitudinal axis of the load transport vehicle away from the load bearing portion.

An aspect combinable with any other aspect includes the following features. An absence of space to deploy the stability control system is determined. Movement of the load transport vehicle is ceased in response.

An aspect combinable with any other aspect includes the following features. The stability control system includes a counterweight and an extension mechanism connected to the counterweight. The extension mechanism includes multiple telescoping tubular members. An end of one of the multiple telescoping tubular members is attached to the counterweight. The extension mechanism includes an actuator connected to the controller. The actuator is connected to the multiple telescoping tubular members. The actuator is configured to actuate the multiple telescoping tubular members to extend or retract. To deploy the stability control system, the controller transmits a signal to the actuator to extend or retract the multiple telescoping tubular members attached to the counterweight.

An aspect combinable with any other aspect includes the following features. The stability control system includes a ball joint. To deploy the stability control system, the controller transmits a signal to the actuator to swing the counterweight about the ball joint on a horizontal plane parallel to the ground on which the load transport vehicle rests or drives.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes a closed loop stability control system that senses a change in the center of mass of a load transport vehicle, for example, a forklift, and automatically adjusts the position of a counterweight on the vehicle to prevent tipping of the vehicle due to the change in the center of mass. For example, if a load on the forklift causes the center of mass to move forward on the longitudinal axis of the forklift, then the control system can automatically extend the counterweight along the longitudinal axis in the opposite direction to balance the forklift. In another example, if the forklift is about to tip while turning or because the driving surface is uneven, the control system can automatically swivel the counterweight away from the longitudinal axis to counter the tipping. In a third example, the extension and swiveling can be coupled based on the sensed dipping.

Implementations of the subject matter described in this disclosure can remedy the problem of forklifts toppling due to overload, uneven surfaces, or unpredictable workplace incidents. The stability control system described here can control the location of the center of mass of the forklift, and always keep the center of mass at a position that maintains stability and balance of the forklift even when the forklift is overloaded, driving on uneven surfaces, or accelerating or decelerating suddenly. If the stability control system determines that the load is greater than a load threshold and cannot be compensated for by shifting the center of mass (for example, due to space constraints or a high-speed of the vehicle), the system can freeze functioning of the forklift and additionally raise an alarm. The stability control system described here can be built in to new load transport vehicles or retrofitted into existing ones.

In the description that follows, implementations have been disclosed in the context of a forklift. However, the stability control system and techniques described here can be applied to other load transport vehicles that carry and transport load on either ends. Examples of such vehicles include backhoe loaders, hydraulic excavators, mini-excavators, crawler dozers, electric excavators, skidsteer loaders, to name a few.

Figure 1:
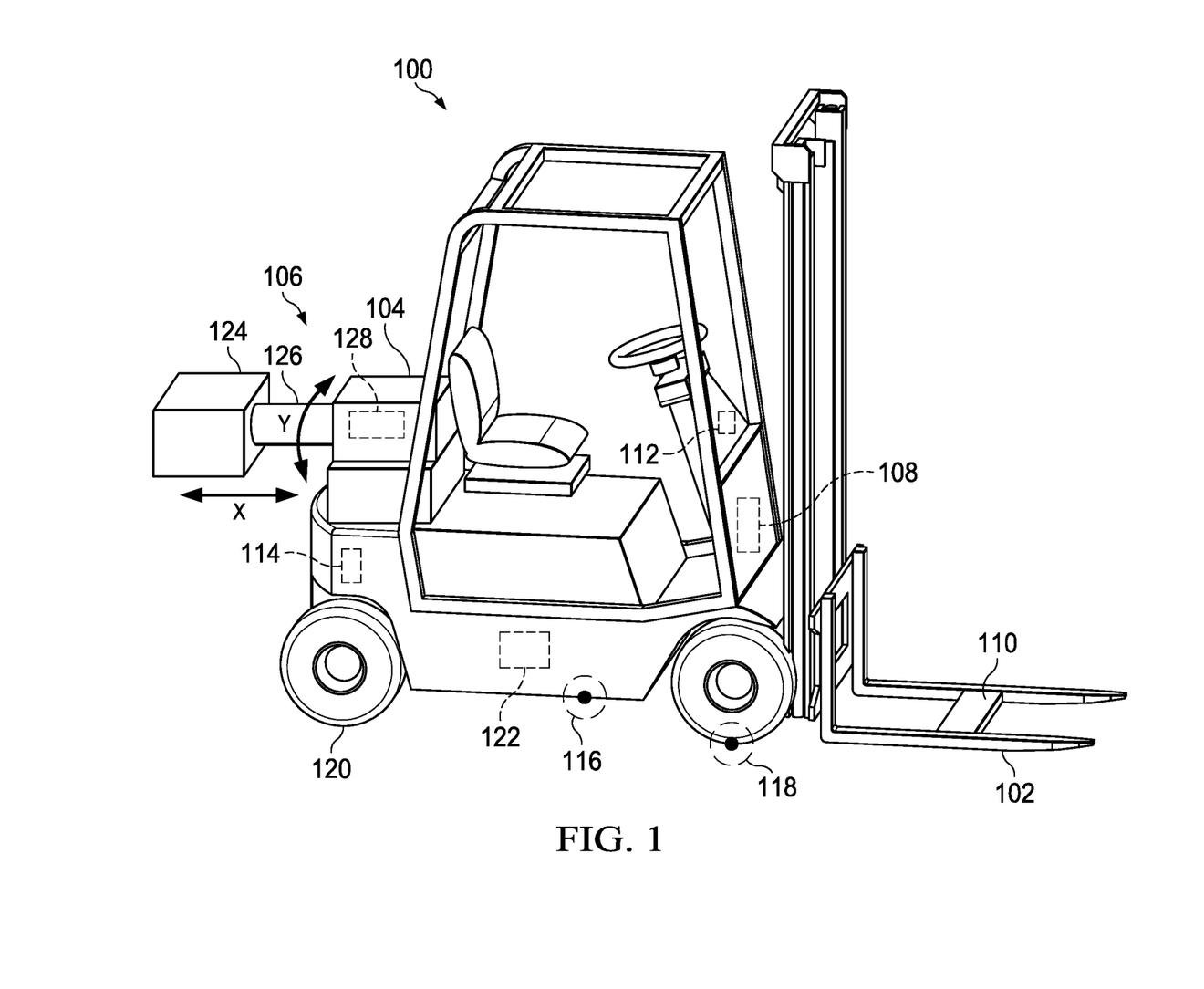
FIG. 1 is a schematic diagram of an example of a forklift including an example of a stability control system.

FIG. 1 is a schematic diagram of an example of a forklift 100 including an example of a stability control system. The forklift 100 includes a load bearing portion 102 that is configured to carry a load. For example, the load bearing portion 102 includes forks mounted to a front end of the forklift 100 that can be raised or lowered (for example, hydraulically or pneumatically) to carry a load. The load carried by the load bearing portion 102 can induce a moment that can cause the forklift 100 to tip forward under the weight of the load. That is, the moment can cause the forklift 100 to rotate along a first vertical plane (FIG. 2, 204) perpendicular to the ground on which the forklift rests or is driven. To counter such tipping, the forklift 100 includes a counterweight 104 mounted on the forklift 100 along a longitudinal axis (FIG. 2, 202) of the forklift 100.

In general, the counterweight 104 is a body having a weight sufficient to counter the tipping moment induced by the heaviest load that the load bearing portion 102 is configured to support. The location of the counterweight 104 on the forklift 100 is chosen based on the location of the center of mass 116 and the location of the tipping point 118 of the forklift 100. That is, as the load on the load bearing portion 102 increases, the location of the center of mass 116 moves towards the front end of the forklift 100 along the longitudinal axis. Such movement of the center of mass 116 induces a moment to cause the forklift 100 to rotate about the center of mass 116. The counterweight 104 counters such as rotation by inducing a counter moment in the opposite direction. Similarly, when the forklift 100 turns, the center of mass 116 is displaced transversely from the longitudinal axis. Such displacement induces a moment that can cause the forklift 100 to rotate along a second vertical plane (FIG. 2, 206) that is, perpendicular to the first vertical plane. That is, the moment can cause the forklift 100 to tip sideways. The counterweight 104 can counter such sideways rotation as well. In some implementations, the counterweight 104 is stationary relative to the forklift 100. That is, the position of the counterweight 104 on the forklift 100 does not change.

Figure 2:
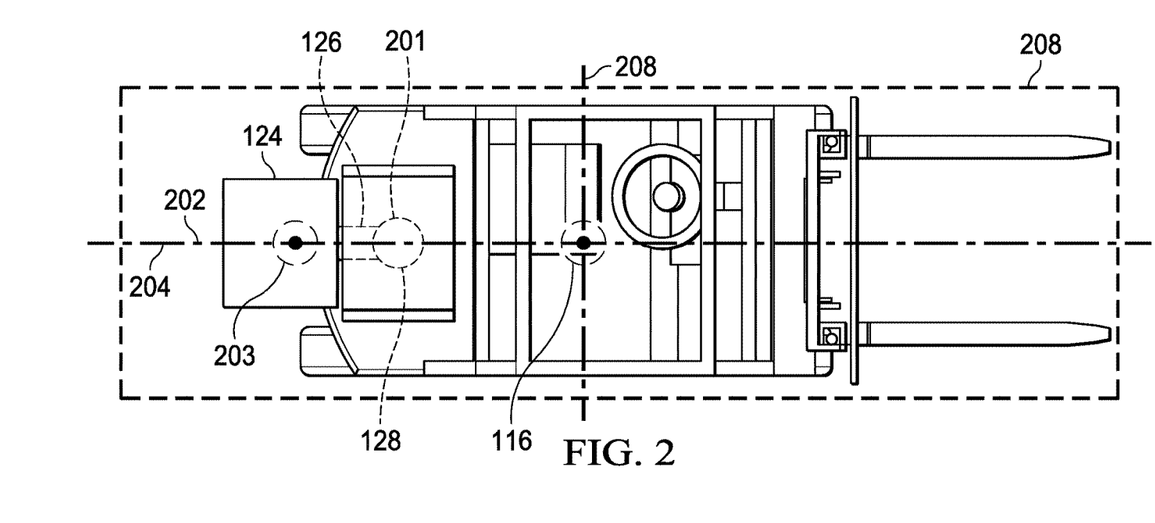
FIG. 2 is a schematic diagram of the forklift of FIG. 1 with the stability control system in an undeployed state.

In some instances of operation, for example, when the forklift 100 is on an uneven surface or is accelerating or decelerating or is turning, while the load bearing portion 102 carries the load, the center of mass 116 may move past the tipping point 118 along the longitudinal axis or be displaced transversely from the longitudinal axis inducing a moment, greater than what the counterweight 104 can counter. In such instances, the forklift 100 risks losing stability and dipping either forward or sideways. To address the problem of the forklift 100 potentially losing stability, in some implementations, the forklift 100 includes a stability control system 106 mounted on the forklift 100. The stability control system 106 is extendable along the longitudinal axis to counter the moment that causes the forklift 100 to rotate along the first vertical plane (FIG. 2, 204). The stability control system 106 is also swingable along a horizontal plane (FIG. 2, 208) parallel to the ground to counter a moment causing the forklift 100 to rotate along the second vertical plane (FIG. 2, 206).

In some implementations, the forklift 100 includes a controller 108 that is connected to the stability control system 106. The controller 108 can be a computer system that includes one or more processors and a computer-readable medium (for example, a non-transitory computer-readable medium) storing instructions executable by the one or more processors to perform operations described in this disclosure. Alternatively or in addition, the controller 108 can include processing circuitry, firmware, software, hardware or any combination of them. The controller 108 is configured to control extension and swinging of the stability control system 106 to counter the moments that cause the forklift 100 to tip, such moments being greater than moments that the counterweight 104 can counter.

In some implementations, the controller 108 can transmit a first signal to deploy the stability control system 106 to extend along the longitudinal axis, responsive to determining the moment that can cause the forklift 100 to rotate along the first vertical plane (FIG. 2, 204). In some implementations, the controller 108 can transmit a second signal to deploy the stability control system 106 to swing along the horizontal plane (FIG. 2, 208), responsive to determining the moment that can cause the forklift 100 to rotate along the second vertical plane (FIG. 2, 206). In some implementations, the controller 108 can transmit the first signal and the second signal simultaneously to cause the stability control system 106 to both extend and swing at the same time to counter both moments simultaneously.

In some implementations, the forklift 100 includes a load sensor 110 that can sense the load carried by the load bearing portion 102. The load sensor 110 is attached to the load bearing portion 102 and to the controller 108. The load sensor 110 can periodically (for example, one or more times per second) transmit sensed load values to the controller 108 when the forklift 100 is stationary or moving. In response to receiving the load values from the load sensor 110, the controller 108 can determine the moment that causes the forklift 100 to rotate along the first vertical plane (FIG. 2, 204). The controller 108 can store a threshold moment, or a threshold load, or other threshold value beyond which the forklift 100 is likely to rotate along the first vertical plane (FIG. 2, 204). As long as the moment induced by the load sensed by the load sensor 110 is less than the stored threshold moment or the load is less than the threshold load or the value determined using the sensed load is less than the threshold value, the controller 108 takes no action with reference to the stability control system 106. When the sensed load induces a moment greater than the threshold moment, or is greater than the threshold load or otherwise fails to satisfy the threshold value, the controller 108 can transmit the first signal to the stability control system 106 to extend along the longitudinal axis to prevent the forklift 100 from tipping. In such instances, the stability control system 106 assists the counterweight 104 to maintain stability of the forklift 100.

In some implementations, the forklift 100 includes a tipping sensor 112 that can sense a tendency of the forklift 100 to tip sideways. The tipping sensor 112 is attached to the forklift 100 and to the controller 108. In general, the tipping sensor 112 is attached at a location of the forklift 10 that is most sensitive to tipping. For example, the tipping sensor 112 is attached at a location that is farthest from the location of the center of mass 116 when the forklift 100 will not tip either forward or sideways such as when the forklift 100 is unloaded and stationary. In another example, the tipping sensor 112 can be placed at the top of the case above the driver allowing the tipping sensor 112 to detect the most minute shift in the orientation of the forklift 100.

The tipping sensor 112 can periodically (for example, one or more times per second) transmit sensed tipping values to the controller 108 when the forklift 100 is stationary or moving. In some implementations, the tipping sensor 112 is a strain gauge sensor used to measure strain on an object. The gauge is usually attached to the object by a suitable adhesive and as the object is deformed the electrical resistance of the gauge changes producing different DC voltage output reading. The output of such sensor is then amplified to be sent to the controller 108. Linear DC voltage is then translated by the controller 108 to correspond to a strain stress value. This strain stress value can be used to determine the weight being carried by the forklift 100 and hence determine the shift in center of mass 116 to compensate for such shift. In response to receiving the tipping values from the tipping sensor 112, the controller 108 can determine the moment that causes the forklift 100 to rotate along the second vertical plane (FIG. 2, 206). The controller 108 can store a threshold moment, or a threshold load, or other threshold value beyond which the forklift 100 is likely to rotate along the second vertical plane (FIG. 2, 206). As long as the moment induced by the tipping values sensed by the tipping sensor 112 is less than the stored threshold moment or the tipping value is less than the threshold tipping value or the value determined using the sensed load is less than the threshold value, the controller 108 takes no action with reference to the stability control system 106. When the sensed tipping value induces a moment greater than the threshold moment, or is greater than the threshold tipping value or otherwise fails to satisfy the threshold value, the controller 108 can transmit the second signal to the stability control system 106 to swing along the horizontal plane (FIG. 2, 208) to prevent the forklift 100 from tipping. In such instances also, the stability control system 106 assists the counterweight 104 to maintain stability of the forklift 100.

In some implementations, the controller 108 is connected to the engine 122 mounted to the forklift 100 to provide to force to drive the forklift 100 and to the multiple wheels 120. Wheels 120 are coupled to the engine 122 to transport the forklift 100 under the motor force provided by the engine 122. Using these connections, the controller 108 can determine a speed of the forklift 100 and a direction in which the forklift 100 travels. The controller 108 can determine the moments described earlier using the speed and the direction of travel. For example, the controller 108 can use the value from the strain gauge (described earlier) and, through a linear relationship, determine an output to the moment on the extension mechanism 126. Knowing a length of the extension mechanism 126, the controller 108 can implement a formula of "Moment=Distance X Mass" to determine the mass producing the moment. The controller 108 can use the determined mass with the center of mass 116 to determine an actual center of mass (or offset center of mass) 210 (FIG. 3), as described later. Responsive to determining the location of the actual center of mass, the controller 108 can extend or retract the extension mechanism 126 to move the counterweight 124 so that the center of mass of the forklift 100 is re-centered.

In some implementations, a position sensor 114 (or more than one position sensor) is mounted to the forklift 100, for example, on the back end of the forklift 100 near the stability control system 106. The position sensor 114 (for example, a laser-based position sensor) can sense the presence of objects or obstacles in the vicinity of the stability control system 106. The controller 108 can receive information sensed by the position sensor 114 in real-time. Based on the information received from the position sensor 114, the controller 108 can determine whether the stability control system 106 can be deployed to an extent necessary to maintain the stability of the forklift 100, as described earlier. If the controller 108 determines that the stability control system 106 cannot be deployed, for example, because the position sensor 114 has sensed the presence of an obstacle along the longitudinal axis of the forklift 100 on either side of the forklift 100, the controller 108 can cause the forklift 100 to cease all operations or to output an alarm signal, or both. For example, the forklift 100 can include a light source or an audio source to which the controller 108 can transmit a signal causing the alarm signal (for example, light or sound) to be output while simultaneously transmitting a turn-off signal to the engine 122 or a lock signal to the wheels 120 in response to which the engine 122 turns off or the wheels 120 lock (or both).

In some implementations, the controller 108 receives sensed values, for example, from the load sensor 110, the tipping sensor 112, the position sensor 114, the engine 122, the wheels 120 and from any other sensors in real-time. For the purposes of this disclosure, real-time or variations of real-time (for example, real time, realtime, real (fast) time (RFT), near(ly) real-time (NRT), quasi real-time, or similar terms) mean that an action and a response are temporally proximate such that an individual perceives the action and the response occurring substantially simultaneously. For example, the time difference for a sensor transmitting a sensed value following the sensing may be less than 1 ms, less than 1 sec., less than 5 secs., etc. Similarly, the controller 108 executes operations to determine if the sensed load induces destabilizing moments and to responsively deploy the stability control system 106 or to cease all operations or to output an alarm signal or both in real-time. Also, the controller 108 is configured to determine the first signal or the second signal to deploy the stability control system 106 when the forklift 100 is either stationary or in motion. In addition, in instances in which the forklift 100 experiences moments causing the forklift 100 to rotate along the first vertical plane (FIG. 2, 204) and the second vertical plane (FIG. 2, 206), the controller 108 is configured to computationally resolve both moments and to determine the first signal and the second signal simultaneously to cause the stability control system 106 to extend and prevent simultaneously to stabilize the forklift 100.

In some implementations, the stability control system 106 includes a counterweight 124 and an extension mechanism 126 connected to the counterweight 124. The extension mechanism 126 can extend or retract the counterweight 124 based on signals received from the controller 108. The extension mechanism 126 includes multiple telescoping tubular members. One end of the multiple telescoping tubular members is attached to the counterweight 124. The tubular members can be made of a material that can support the counterweight 124 without bending at maximum extension of the tubular members. For example, an I-beam structure can be used to make the tubular members. The extension mechanism 126 also includes an actuator 128 connected to the controller 108. The actuator 128 is connected to the multiple telescoping tubular members and can actuate the members, for example, hydraulically, pneumatically, electrically, or otherwise, to extend or retract. The stability control system 106 also includes a ball joint (FIG. 2, 201). The actuator 128 can swing the second counterweight 124 about the ball joint (FIG. 201). Examples of the stability control system 106 being deployed under different driving conditions of the forklift 100 have been described with reference to FIGS. 2-6.

FIG. 2 is a schematic diagram of the forklift of FIG. 1 with the stability control system 106 in an undeployed state. The schematic diagram shows a top view of the forklift 100. The center of mass 116 of the forklift 100 and a center of mass 203 of the stability control system 106 lie on the longitudinal axis 202. In the configuration shown in the schematic diagram of FIG. 2, the center of mass 116 of the forklift 100 is at a location (for example, on the longitudinal axis 202 and sufficiently far away from the front end of the forklift 100) such that any moment induced along the first vertical plane 204 or along the second vertical plane 206 does not cause the forklift 100 to rotate along the first vertical plane 204 or the second vertical plane 206. The moment maybe induced by a load carried by the forklift 100 or by a driving speed or acceleration or deceleration of the forklift 100 or by a turning speed of the forklift 100. Because the moment does not induce any instability on the forklift 100, the stability control system 106 is undeployed. In the undeployed state, the actuator 128 maintains the multiple telescoping tubular members in a fully retracted state. The counterweight 124 is as close to the back end of the forklift 100 as possible. In some implementations, the counterweight 124 can rest on top of the counterweight 104 when the stability control system 106 is in the undeployed state. In this manner, for a range of operating conditions (for example, load conditions, speed conditions, driving surface conditions, turning conditions), the controller 108 can determine that the location of the center of mass 116 does not necessitate deployment of the stability control system 106.

Figure 3:
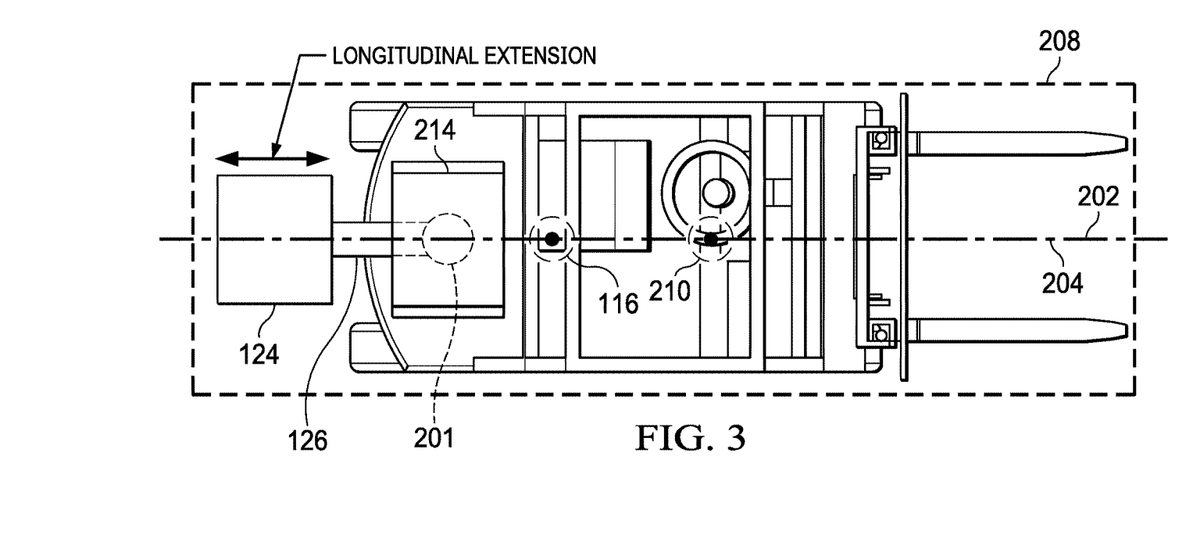
FIG. 3 is a schematic diagram of the forklift of FIG. 1 with the stability control system in a deployed state.

FIG. 3 is a schematic diagram of the forklift 100 of FIG. 1 with the stability control system 106 in a deployed state. In the schematic diagram of FIG. 3, the forklift 100 is traveling in a straight line along its longitudinal axis 202 without any load on the load bearing portion 102. Alternatively or in addition, the forklift 100 is carrying a load and is traveling in the straight line. The forklift 100 can be traveling in the straight line at a constant speed or can be accelerating or decelerating uniformly or non-uniformly. Such travel by the forklift 100 causes the center of mass 116 to move forward along the longitudinal axis 202 and closer to the front end of the forklift 100 to a new location 210. At this location, the operating conditions of the forklift 100 induce a moment that can cause the forklift to rotate about the new location 210 of the center of mass along the first vertical plane 204. As described earlier, the controller 108 receives sensed values from multiple sensors to determine the induced moment and to determine that the induced moment is sufficiently large to cause the rotation of the forklift 100. In response, the controller 108 transmits a signal to the actuator 128 of the stability control system 106. The actuator 128, responsively, extends the multiple tubular telescoping members causing the counterweight 124 to be moved along the longitudinal axis 202 away from the back end of the forklift 100. As the counterweight 124 moves away from the back end of the forklift 100 along the longitudinal axis 202, the center of mass 116 of the forklift 100 moves away from the front end of the forklift towards its location when the stability control system is in the undeployed state. The controller 108 continues to receive the operating conditions of the forklift 100, to determine the induced moment, and to compare the induced moment against the threshold moment value. When the controller 108 determines that the induced moment no longer causes the rotation described earlier (for example, because the center of mass 116 has moved sufficiently within the forklift 100), the controller 108 transmits a signal to the actuator 128 to cease extension of the multiple telescoping tubular members. In response, the actuator 128 ceases extension and maintains the counterweight 124 at the extended location. As the operating conditions of the forklift 100 change (for example, the load is decreased or the vehicle speed, acceleration or deceleration decreases), the controller 108 determines a movement of the center of mass 116 to the location described with reference to FIG. 2. In response, the controller 108 transmits a signal to the stability control system 106 to retract the counterweight 124 and to return the stability control system 106 to the undeployed state.

Figure 4:
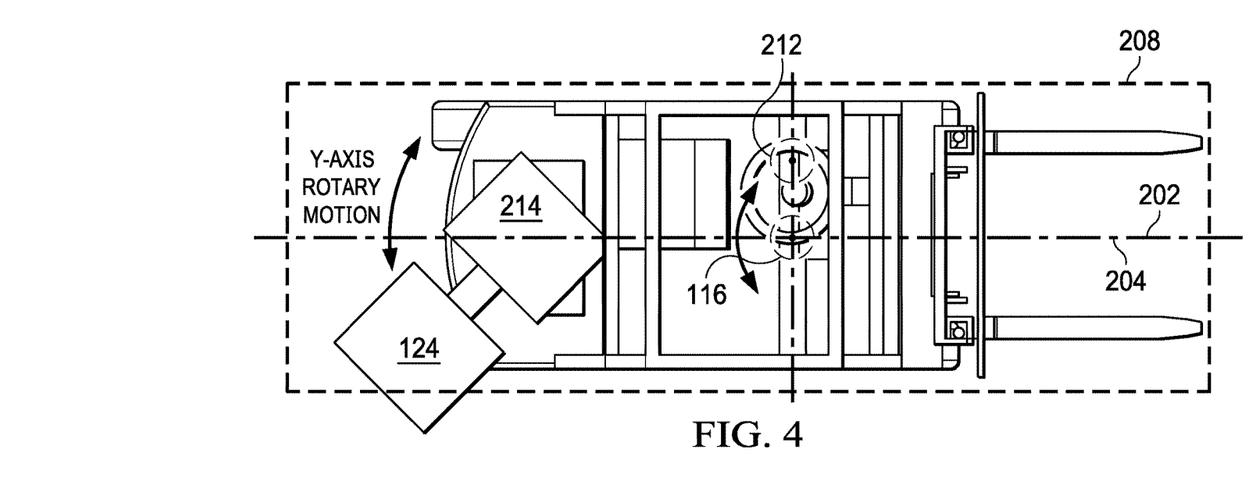
FIG. 4 is a schematic diagram of the forklift of FIG. 1 with the stability control system in a deployed state.

FIG. 4 is a schematic diagram of the forklift 100 of FIG. 1 with the stability control system 106 in a deployed state. In the schematic diagram of FIG. 4, the forklift 100 is turning without any load on the load bearing portion 102. Alternatively or in addition, the forklift 100 is carrying a load and is turning. While turning, the forklift 100 can be traveling at a constant speed or can be accelerating or decelerating uniformly or non-uniformly. Such travel by the forklift 100 causes the center of mass 116 to move transversely away from the longitudinal axis 202 to a new location 212. At this location, the operating conditions of the forklift 100 induce a moment that can cause the forklift to rotate about the new location 212 of the center of mass 116 along the second vertical plane 206 which is perpendicular to the first vertical plane 204. As described earlier, the controller 108 receives sensed values from multiple sensors to determine the induced moment and to determine that the induced moment is sufficiently large to cause the rotation of the forklift 100. In response, the controller 108 transmits a signal to the actuator 128 of the stability control system 106. The actuator 128, responsively, swivels (or swings) the counterweight 124 about the ball joint 201 along the horizontal plane 208 from its position along the longitudinal axis 202 to a new position offset from the longitudinal axis 202. For example, if the controller 108 determines that the induced moment will cause the forklift 100 to tip to the left, then the signal from the controller 108 causes the counterweight 124 to be swung to the right (that is, the opposite side of the tip). In this manner, the counterweight 124 is swung to counter the offset of the center of mass 116 from the longitudinal axis 202. As the counterweight 124 swings to the opposite side of the tip, the center of mass 116 of the forklift 100 moves away from the offset position towards its location when the stability control system 106 is in the undeployed state, that is, on the longitudinal axis 202. The controller 108 continues to receive the operating conditions of the forklift 100 to determine the induced moment and to compare the induced moment against the threshold moment value. When the controller 108 determines that the induced moment no longer causes the rotation described earlier, the controller 108 transmits a signal to the actuator 128 to cease swinging of the counterweight 124. In response, the actuator 128 ceases swinging and maintains the counterweight 124 at the offset location. As the operating conditions of the forklift 100 change (for example, the turn is completed and the forklift 100 returns to traveling in a straight line), the controller 108 determines a movement of the center of mass 116 to the location described with reference to FIG. 2. In response, the controller 108 transmits a signal to the stability control system 106 to swing the counterweight 124 back toward the longitudinal axis 202 and to return the stability control system 106 to the undeployed state.

Figure 5:
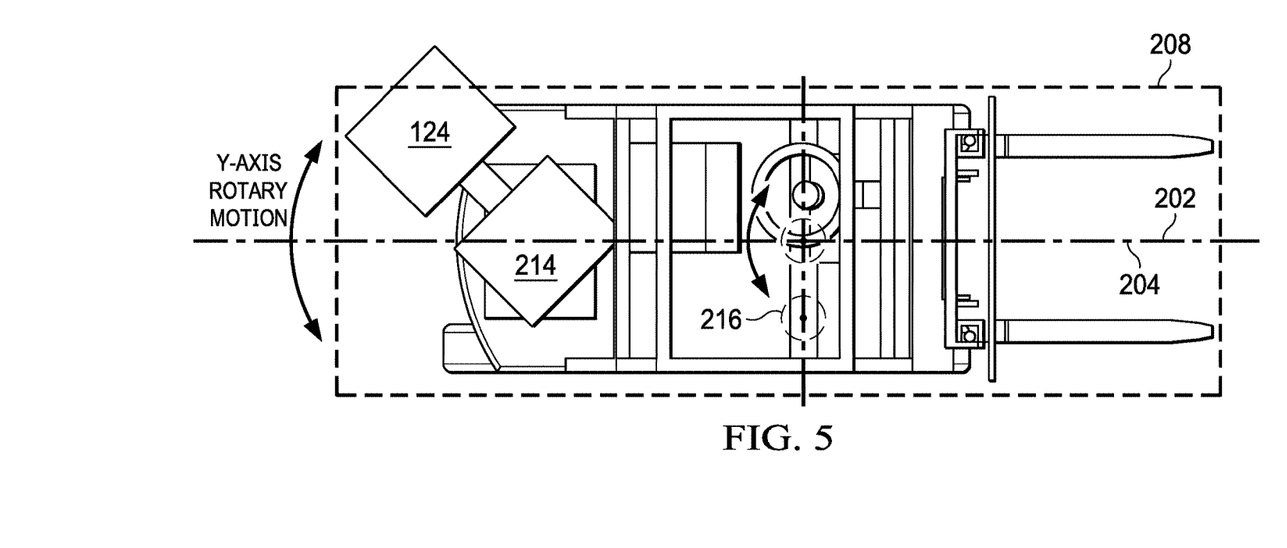
FIG. 5 is a schematic diagram of the forklift of FIG. 1 with the stability control system in a deployed state.

FIG. 5 is a schematic diagram of the forklift 100 of FIG. 1 with the stability control system 106 in a deployed state. The schematic diagram of FIG. 5 represents the forklift 100 turning in a direction that is 180 degrees opposite that of the direction schematically shown in FIG. 4. In response, the controller 108 causes the counterweight 124 to swing in a direction that is 180 degrees opposite that of the direction schematically shown in FIG. 4.

Figure 6:
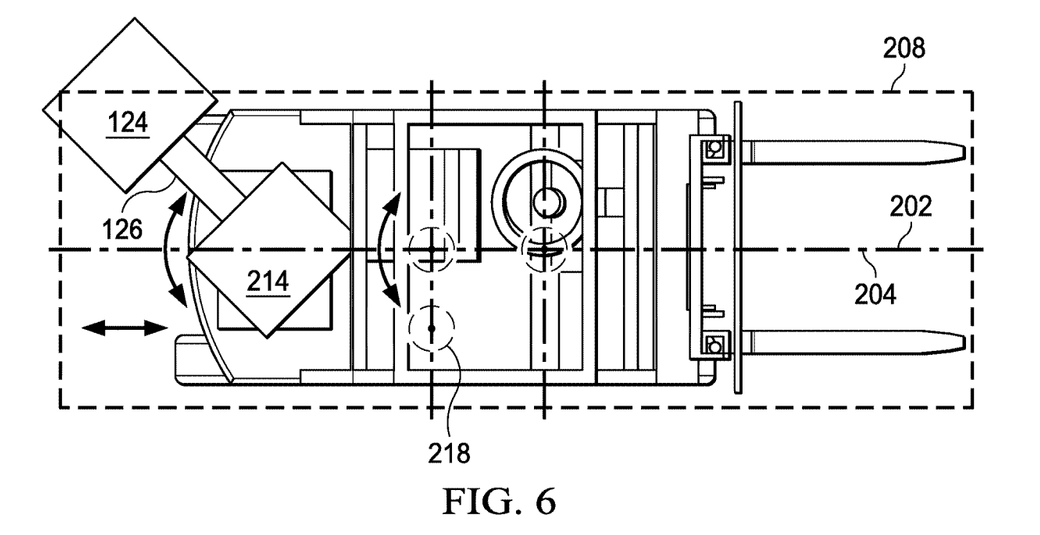
FIG. 6 is a schematic diagram of the forklift of FIG. 1 with the stability control system in a deployed state.

FIG. 6 is a schematic diagram of the forklift 100 of FIG. 1 with the stability control system 106 in a deployed state. The schematic diagram of FIG. 6 represents a combination of operating conditions shown in FIGS. 4 and 5 or FIGS. 4 and 6. That is, the forklift 100 is with or without a load, traveling at a constant speed or accelerating or decelerating uniformly or non-uniformly, and turning. Such travel by the forklift 100 causes the center of mass 116 to both move forward along the longitudinal axis 202 and closer to the front end of the forklift 100 and move transversely away from the longitudinal axis 202 to a new location 218. As described earlier, the controller 108 receives sensed values from multiple sensors to determine the induced moment and to determine that the induced moment is sufficiently large to cause the rotation of the forklift 100 about the first vertical plane 204 or the second vertical plane 206 or both. In response, the controller 108 transmits a signal to the actuator 128 of the stability control system 106. The actuator 128, responsively, extends the multiple tubular telescoping members causing the counterweight 124 to be moved along the longitudinal axis 202 away from the back end of the forklift 100 and at the same time swivels (or swings) the counterweight 124 about the ball joint 201 along the horizontal plane 208 from its position along the longitudinal axis 202 to a new position offset from the longitudinal axis 202. As the counterweight 124 both extends and swings, the center of mass 116 of the forklift 100 moves towards its location when the stability control system is in the undeployed state, that is, on the longitudinal axis 202. The controller 108 continues to receive the operating conditions of the forklift 100 to determine the induced moment and to compare the induced movement against the threshold moment value. When the controller 108 determines that the induced moment no longer causes the rotation described earlier, the controller 108 transmits a signal to the actuator 128 to cease extension and swinging of the counterweight 124. In response, the actuator 128 maintains the counterweight 124 at the offset location. As the operating conditions of the forklift 100 change (for example, the turn is completed and the forklift 100 returns to traveling in a straight line), the controller 108 determines a movement of the center of mass 116 to the location described with reference to FIG. 2. In response, the controller 108 transmits a signal to the stability control system 106 to retract and swing the counterweight 124 back toward the longitudinal axis 202 and to return the stability control system 106 to the undeployed state.

A quantity to which the counterweight 124 can be extended or a quantity to which the counterweight 124 can be swung on either side of the longitudinal axis is variable. For example, the multiple telescoping tubular members can have an upper extension limit in which the members are fully extended and the counterweight 124 is as far away from the back end of the forklift 100 as possible. Contrastingly, the members can have a minimum extension limit in which the members are fully retracted and the counterweight 124 is as close to the back end of the forklift 100 as possible, for example, directly above the counterweight 104. The actuator 128 can extend the multiple telescoping tubular members to any distance between the upper extension limit and the lower extension limit. The controller 108 can determine the distance to which the members need to be extended to counter the rotating moments described earlier. For example, the controller 108 can store multiple pairs of values, each pair including a rotating moment and an extension of the tubular members needed to counter the rotating moment. Such values can be pre-programmed into the controller 108 based on dimensions of the tubular members, weight of the counterweight 124, and other parameters of the forklift 100. When the controller 108 determines a rotating moment based on the input from the sensors, the engine, the wheels or similar input sources, the controller 108 can identify, from the multiple pairs of values, an extension of the tubular members that corresponds to the determined rotating moment. Alternatively or in addition, the controller 108 can determine (for example, in real time) the extension of the tubular members using the different sensor inputs and using parameters of the forklift 100. The controller 108 can transmit the signal to extend (or retract) the tubular members to the actuator 128. In some implementations, the controller 108 can embed the determined extension into the signal for the actuator 128 to retrieve.

Similarly, in another example, the multiple telescoping tubular members can have an upper swing limit in which the members are fully swung away from the longitudinal axis 202. At the upper swing limit, the telescoping tubular members can be transverse or perpendicular to the longitudinal axis 202 on either side of the longitudinal axis 202. Contrastingly, the members can have a minimum swing limit in which the members are aligned with the longitudinal axis 202 and a center of mass 116 of the counterweight 124 is on the longitudinal axis 202. Using the ball joint 201, the actuator 128 can swing the multiple telescoping tubular members to any position between the upper swing limit and the lower swing limit. The controller 108 can determine an angle between the longitudinal axis 202 and the multiple telescoping longitudinal members to which the members need to be swung to counter the rotating moments described earlier. The controller 108 can determine the angles either by storing multiple pairs of values, each pair including a rotating moment and an angle to which the tubular members need to be swung to counter the rotating moment or by determining (for example, in real time) the angle using the different sensor inputs and using parameters of the forklift 100. The controller 108 can transmit the signal to swing (for example, on either side) the tubular members to the actuator 128. In some implementations, the controller 108 can embed the determined extension into the signal for the actuator 128 to retrieve.

Figure 7:
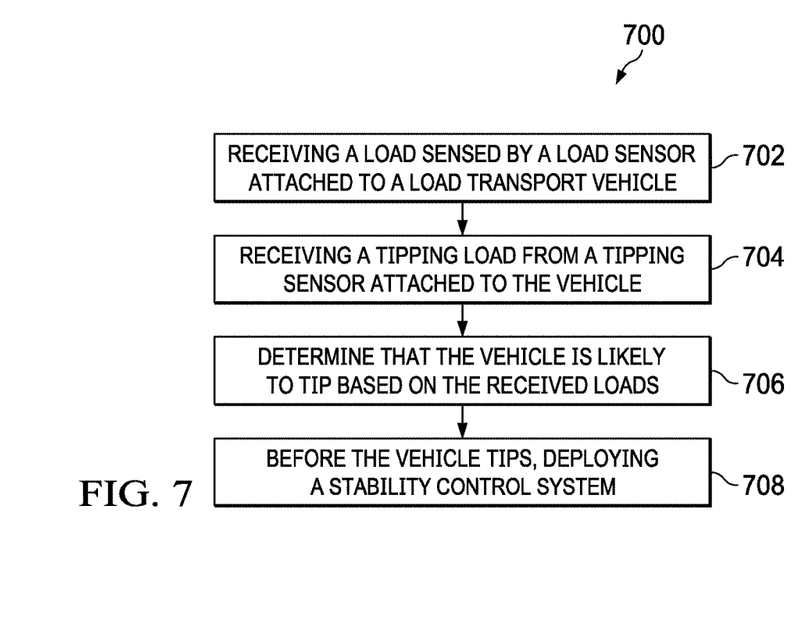
FIG. 7 is a flowchart of an example of a process implemented by the stability control system.

FIG. 7 is a flowchart of an example of a process 700 implemented by the stability control system 106. In some implementations, the process 700 is implemented by a controller similar to the controller 108 mounted on and attached to a load transport vehicle similar to the forklift 100. At 702, a load sensed by a load sensor attached to a load bearing portion of a load transport vehicle is received. The load generates a first moment along a first vertical plane perpendicular to a ground on which the load transport vehicle rests or is driven. The first vertical plane is parallel to a longitudinal axis of the load transport vehicle. At 704, a tipping load is received from a tipping sensor attached to the load transport vehicle. The tipping load generates a second moment along a second vertical plane perpendicular to the first vertical plane. At 706, based on the received load and the received tipping load, it is determined that the load transport vehicle is likely to tip along the second vertical plane in a direction. At 708, before the vehicle tips along the second vertical plane in the direction and in response to determining that the load transport vehicle is likely to trip, a stability control system mounted on the load transport vehicle is deployed. The deploying includes swinging the stability control system in a direction opposite to the direction in which the load transport vehicle is likely to trip.

In some implementations, the stability control system is extended along the longitudinal axis of the load transport vehicle away from the load bearing portion. In some implementations, it is determined that a space is unavailable to deploy the stability control system, for example, due to a presence of an object or obstacle either behind or on either side of the load transport vehicle. In response, the movement of the vehicle is ceased.

In the implementations described above, the counterweight of the stability control system has been described as being separate from the counterweight that keeps the vehicle from tipping when the stability control system is not needed. In some implementations, the latter counterweight can be used in place of the counterweight of the stability control system. That is, the vehicle can include only one counterweight which the stability control system can extend or retract or swing from side to side to counter the rotation induced by the moments described in this disclosure.

Also, in the implementations described above, the counterweight of the stability control system has been described as being swung from side-to-side about a ball joint on a horizontal plane. As an alternative to such swinging, the stability control system including the counterweight can be moved transverse to the longitudinal axis. For example, a track transverse to the longitudinal axis can be mounted to the load transport vehicle, specifically, on the counterweight 104. The actuator 128 of the stability control system 106 can be mounted on the track. The counterweight 124 and the extension mechanism 126 can be connected to the actuator 128 as described earlier. When the controller 108 determines that the counterweight 124 needs to be moved transversely to the longitudinal axis 202, the controller 108 can transmit a signal to the actuator 128. In response, the actuator 128 can move the entire stability control system 106 including the counterweight 124, the extension mechanism 126 and the actuator 128 on the track by a distance offset from the longitudinal axis 202. The controller 108 can determine the offset distance based on a moment that induces that forklift 100 to tip along the second vertical plane 206.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A load transport vehicle comprising:
   a load bearing portion;
   a counterweight mounted on the load transport vehicle along a longitudinal axis of the load transport vehicle, the counterweight configured to counter a first moment generated by a load carried by the load bearing portion, the first moment causing the load transport vehicle to rotate along a first vertical plane perpendicular to a ground on which the load transport vehicle rests or is driven, the first plane parallel to the longitudinal axis;
   a stability control system mounted on the load transport vehicle, the stability control system extendable along the longitudinal axis to counter a second moment causing the load transport vehicle to rotate along the first vertical plane, the stability control system swingable along a horizontal plane parallel to the ground to counter a third moment causing the load transport vehicle to tip along a second vertical plane perpendicular to the first vertical plane; and
   a controller connected to the stability control system, the controller configured to control extending and swinging of the stability control system based on the second moment and the third moment, respectively, wherein the controller is configured to:
   transmit a first signal to deploy the stability control system to extend along the longitudinal axis responsive to determining the second moment; and
   transmit a second signal to deploy the stability control system to swing about the horizontal plane responsive to determining the third moment.

2. The load transport vehicle of claim 1, further comprising a load sensor attached to and configured to sense the load carried by the load bearing portion, the load sensor connected to and configured to transmit the sensed load to the controller, wherein the controller is configured to determine the second moment based on the sensed load received from the load sensor.

3. The load transport vehicle of claim 2, wherein the controller is configured to transmit the first signal to deploy the stability control system to extend along the longitudinal axis responsive to determining that the second moment exceeds a second moment threshold.

4. The load transport vehicle of claim 2, wherein a quantity by which the stability control system is extendable is variable between an upper extension limit and a lower extension limit, wherein the controller is configured to:
   determine a first quantity by which the stability control system is to be extended to fully counter the second moment and to prevent the load transport vehicle from rotating along the first vertical plane; and
   generate the first signal based on the determined first quantity.

5. The load transport vehicle of claim 4, further comprising a tipping sensor attached to and configured to sense a tipping load that causes the load transport vehicle to tip along the second vertical plane, the tipping sensor connected to and configured to transmit the sensed tipping load to the controller, wherein the controller is configured to determine the third moment based on the sensed tipping load received from the load sensor.

6. The load transport vehicle of claim 5, wherein a quantity by which the stability control system is swingable is variable between an upper swing limit and a lower swing limit, wherein the controller is configured to:
   determine a second quantity by which the stability control system is to be swung to fully counter the third moment and to prevent the load transport vehicle from tipping along the second vertical plane; and
   generate the second signal based on the determined second quantity.

7. The load transport vehicle of claim 4, wherein the controller is configured to transmit the second signal to deploy the stability control system to swing about the horizontal plane responsive to determining that the third moment exceeds a third moment threshold.

8. The load transport vehicle of claim 1, wherein the controller is configured to determine the first signal or the second signal when the load transport vehicle is stationary or in motion.

9. The load transport vehicle of claim 1, wherein the controller is configured to determine the first signal and the second signal simultaneously causing the stability control system to extend and swing simultaneously.

10. The load transport vehicle of claim 1, wherein the counterweight is above a portion where the load transport vehicle rests on the ground and the stability control system is directly attached to and immediately above the counterweight.

11. The load transport vehicle of claim 1, wherein a center of mass of the load transport vehicle and a center of mass of the stability control system lie on the longitudinal axis.

12. The load transport vehicle of claim 1, wherein the counterweight is a first counterweight, wherein the stability control system comprises:
- a second counterweight; and
- an extension mechanism connected to the second counterweight and configured to extend or retract the second counterweight, the extension mechanism comprising:
  - a plurality of telescoping tubular members, wherein an end of one of the plurality of telescoping tubular members is attached to the second counterweight, and
  - an actuator connected to the controller, the actuator connected to the plurality of telescoping tubular members, the actuator configured to actuate the plurality of telescoping tubular members to extend or retract.

13. The load transport vehicle of claim 12, wherein the stability control system comprises a ball joint, wherein the actuator is configured to swing the second counterweight about the ball joint.

14. The load transport vehicle of claim 1, further comprising:
- an engine mounted to the load transport vehicle to provide motive force to drive the load transport vehicle; and
- a plurality of wheels coupled to the engine to transport the load transport vehicle under the motive force provided by the engine,
- wherein the controller is connected to the engine and the plurality of wheels and is configured to determine the second moment and the third moment based, in part, on a speed of the load transport vehicle.

15. A method comprising:
- receiving, by a controller, a load sensed by a load sensor attached to a load bearing portion of a load transport vehicle, the load carried by the load bearing portion, the load generating a first moment along a first vertical plane perpendicular to a ground on which the load transport vehicle rests or is driven, the first vertical plane parallel to a longitudinal axis of the load transport vehicle;
- receiving, by the controller, a tipping load from a tipping sensor attached to the load transport vehicle, the tipping load generating a second moment along a second vertical plane perpendicular to the first vertical plane;
- determining, by the controller and based on the received load and the received tipping load, that the load transport vehicle is likely to tip along the second vertical plane in a direction; and
- before the vehicle tips along the second vertical plane in the direction, deploying, by the controller, a stability control system mounted on the load transport vehicle in response to determining that the load transport vehicle is likely to tip, wherein the deploying comprises swinging the stability control system in a direction opposite to the direction in which the load transport vehicle is likely to tip.

16. The method of claim 15, wherein the deploying further comprises extending the stability control system along the longitudinal axis of the load transport vehicle away from the load bearing portion.

17. The method of claim 16, further comprising:
- determining an absence of space to deploy the stability control system; and
- causing the load transport vehicle to cease movement in response to determining the absence of the space to deploy the stability control system.

18. The method of claim 16, wherein the stability control system comprises:
- a counterweight; and
- an extension mechanism connected to the counterweight and configured to extend or retract the counterweight, the extension mechanism comprising:
  - a plurality of telescoping tubular members, wherein an end of one of the plurality of telescoping tubular members is attached to the counterweight, and
  - an actuator connected to the controller, the actuator connected to the plurality of telescoping tubular members, the actuator configured to actuate the plurality of telescoping tubular members to extend or retract,
- wherein deploying the stability control system comprises transmitting a signal to the actuator to extend or retract the plurality of telescoping tubular members attached to the counterweight.

19. The method of claim 18, wherein the stability control system comprises a ball joint, wherein deploying the stability control system comprises transmitting a signal to the actuator to swing the counterweight about the ball joint on a horizontal plane parallel to the ground on which the load transport vehicle rests or drives.

\* \* \* \* \*